United States Patent [19]

Tsai

[11] Patent Number: 5,700,103
[45] Date of Patent: Dec. 23, 1997

[54] MOUNTING STRUCTURE

[76] Inventor: Chun-Hsin Tsai, NO. 38, Lane 49, Chien Fu Rd., Hsin Chuang City, Taipei Hsien, Taiwan

[21] Appl. No.: 676,922

[22] Filed: Jul. 8, 1996

[51] Int. Cl.$^6$ ............................. F16B 5/02; F16B 37/04
[52] U.S. Cl. ........................ 403/260; 403/256; 411/366; 411/175; 411/104
[58] Field of Search ............................ 411/104, 174, 411/175, 160, 161, 366; 403/260, 256

[56] References Cited

U.S. PATENT DOCUMENTS

| | | | |
|---|---|---|---|
| 2,402,556 | 6/1946 | Judd | 411/366 X |
| 3,927,707 | 12/1975 | Wright | 411/174 |
| 4,875,816 | 10/1989 | Peterson | 411/104 |
| 5,026,235 | 6/1991 | Muller et al. | 411/175 X |

FOREIGN PATENT DOCUMENTS

| | | | |
|---|---|---|---|
| 993510 | 11/1951 | France | 411/161 |
| 2203620 | 8/1972 | Germany | 411/161 |
| 25406 | 11/1968 | Japan | 411/161 |

*Primary Examiner*—Anthony Knight
*Attorney, Agent, or Firm*—Donald C. Casey, Esq.

[57] ABSTRACT

A mounting structure including a locking plate disposed between a mount and a frame structure is described. The locking plate is provided with a central locking hole. A screw is provided with a washer that has a plurality of teeth at the outer periphery of its bottom side. The screw is passed through the washer, the mount and the locking plate into the flame structure. The teeth of the washer clutch the surface of the mount and prevent movement with the turning of the screw. The locking plate will slightly elevate with the turning of the screw, imposing a pressure on the screw to stop it from turning. This ensures firm locking of the mount to the frame structure preventing the screw from driving unduly deep into the frame structure to damage the frame structure or the screw threads.

1 Claim, 5 Drawing Sheets

MOUNTING STRUCTURE

BACKGROUND OF THE INVENTION (a) Field of the Invention

The present invention relates generally to a mounting structure, and more particularly to a mounting structure that can quickly lock a mount to a frame structure.

(b) Description of the Prior Art

FIG. 1 shows a conventional mounting structure. A screw A is passed through a through hole in a mount B and driven into a frame structure C to lock the mount B onto the frame structure C. A washer D is disposed below a screw head of the screw A to form a packing between the screw A and the mount B. However, in actual locking processes, screws are driven into frame structures by a torsional force. The size of the force will vary according to the mount. Although it is possible to use a torsional or electric screwdriver to control the force within a certain range, there may still be a phenomenon of insufficient torsion or excessive torsion. When the torsional force is insufficient, the mount cannot be firmly locked onto the frame structure. Conversely, when the torsional force is excessive, the screw will continue to drive into the frame structure although the mount is already locked firmly onto the frame structure. As shown in FIG. 2, the screw A has urged against a top surface of the mount B that is locked onto the surface of the frame structure C. If a torsional force is continuously applied onto the screw A, the screw A will continue to drive deeper into the frame structure C and bring the mount B to press against the frame structure C, which may result in damage of the screw threads. Worse still, the frame structure C may be damaged. Besides, a clearance cannot be maintained between the mount B and the frame structure C.

SUMMARY OF THE INVENTION

According to a first aspect of the present invention, the mounting structure of the invention essentially comprises a locking plate disposed between a mount and a frame structure for receiving a screw, the screw fitted with a washer having a bottom side the outer periphery of which is provided with a plurality of teeth. In assembly, the screw is passed through the washer, the mount and the locking plate into the frame structure. When the screw is driven into a top side of the mount, the teeth at the bottom side of the washer will grip the mount's surface and will not slip away with the turning of the screw. The locking plate will elevate slightly with the turning of the screw, imposing a pressure on the screw threads to prevent the screw from driving further into the frame structure, thus accomplishing firm locking of the mount on the frame structure, preventing the screw from getting unduly deep into the frame structure due to excessive torsional force. Possible damage to the screw threads and the frame structure may also be prevented. The arrangement of the washer and the locking plate may also help to adjust the clearance between the mount and the frame structure.

According to a second aspect of the present invention, the locking plate of the mounting structure is provided with three substantially L-shaped pawls that are spaced apart from each other by 90 degrees, the distance from each of the pawls to the center of a central locking hole of the locking plate being equivalent to the distance from the center of a through hole of the mount to the outer periphery of the mount, in which the locking hole and the through hole may be quickly aligned by means of the pawls when the locking plate is fitted into that end of the mount with the through hole.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
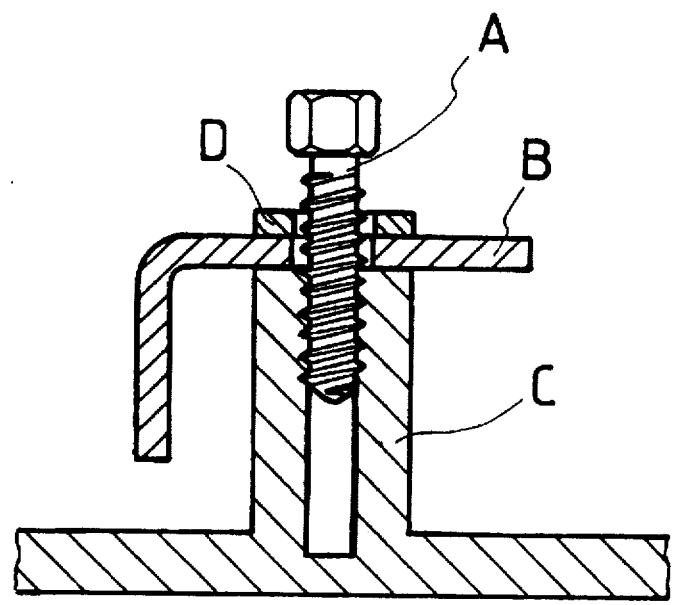
FIG. 1 is a schematic view of a conventional mounting structure.
Figure 2:
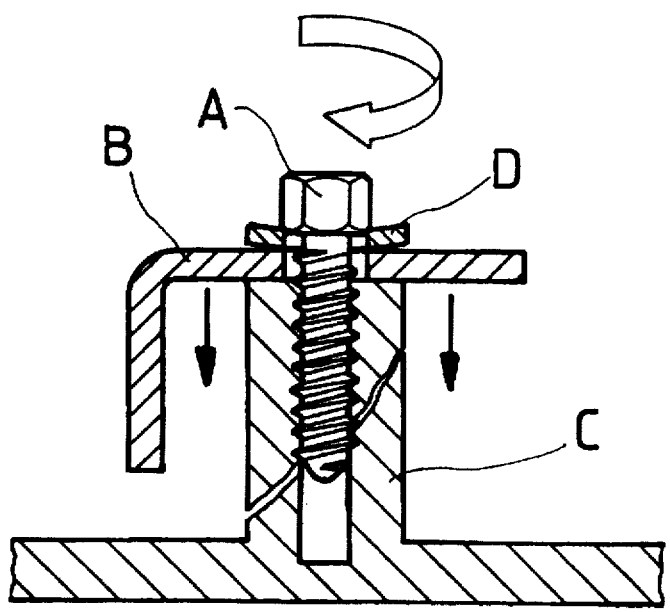
FIG. 2 is a schematic view of the conventional mounting structure in an assembled state.
Figure 3:
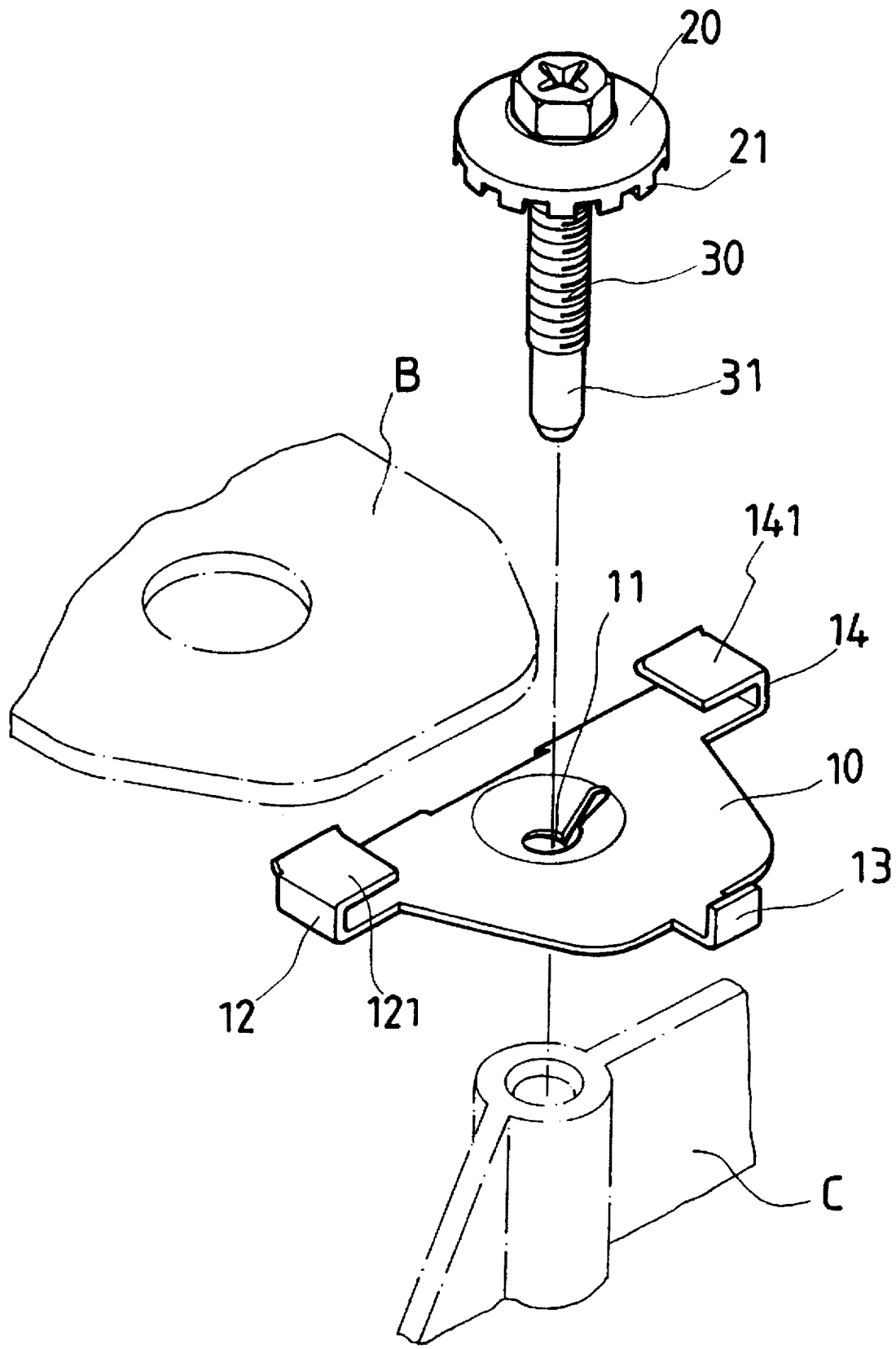
FIG. 3 is a schematic view of the mounting structure of the present invention.
Figure 4:
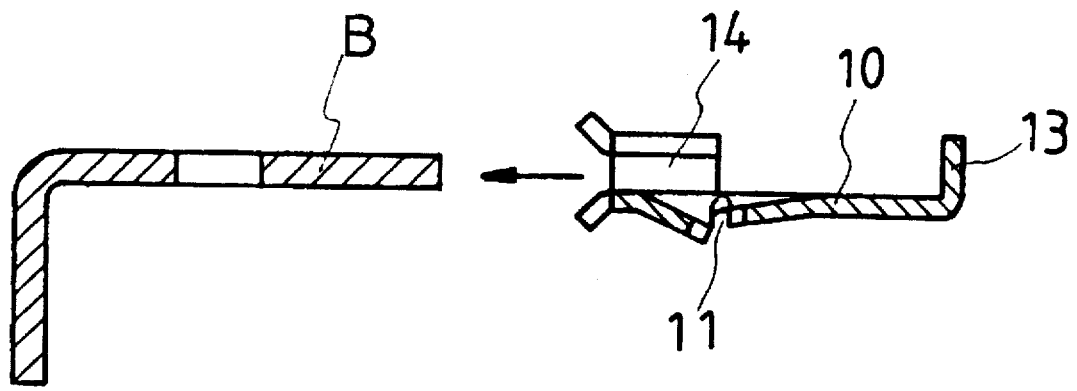
FIG. 4 is a schematic view showing assembly of a locking plate and a mount of the mounting structure.
Figure 5:
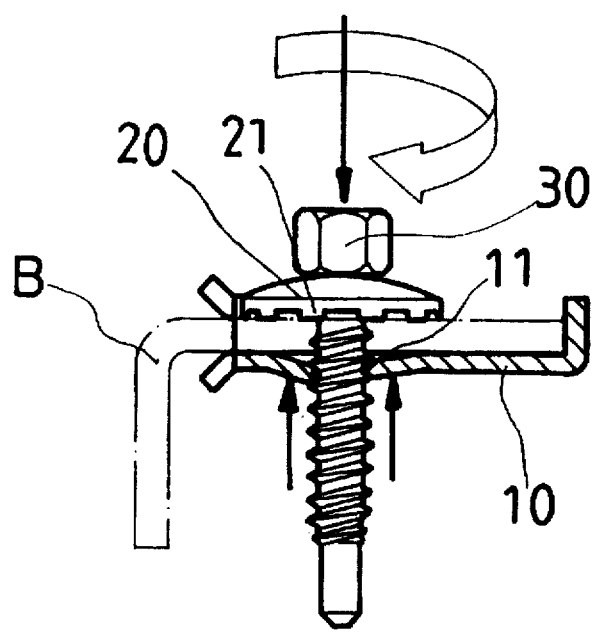
FIG. 5 is a schematic view showing locking of the locking plate and a screw.

With reference to the drawings, the present invention essentially comprises a locking plate 10 and a screw 30 provided with a washer 20. As shown in FIG. 3, the locking plate 10 is a plate-like structure having a locking hole 11 in a central position. The locking hole 11 is obliquely cut so that its inner ring forms a spiral shape so that the screw 30 may be turned and driven into therein. The locking plate 11 further has three substantially L-shaped pawls 12, 13 and 14 at its outer edge. The pawls are spaced apart from each other by 90 degrees. Pawls 12 and 14 are opposite to each other while pawl 13 faces an open end. The distance from each of the pawls 12, 13 and 14 to the center of the locking hole 11 is equivalent to the distance from the center of a through hole of a mount B to its outer edge. Additionally, pawls 12 and 14 are each provided with plate portions 121 and 141 at their top sides respectively such that the mount B may be retained by the locking plate 10. The plate portions 121 and 141 as well as a bottom side of the locking plate 10 flare slightly outwardly in the direction of the open end so that the mount B may be smoothly fitted into the locking plate 10.

The screw 30 may be any ordinary mechanical or wooden screw. The screw 30 has a tip which extends to form an elongated guide portion 31. An outer periphery of a bottom side of the washer is circumferentially provided with a plurality of tooth-like portions 21.

Figure 6B:
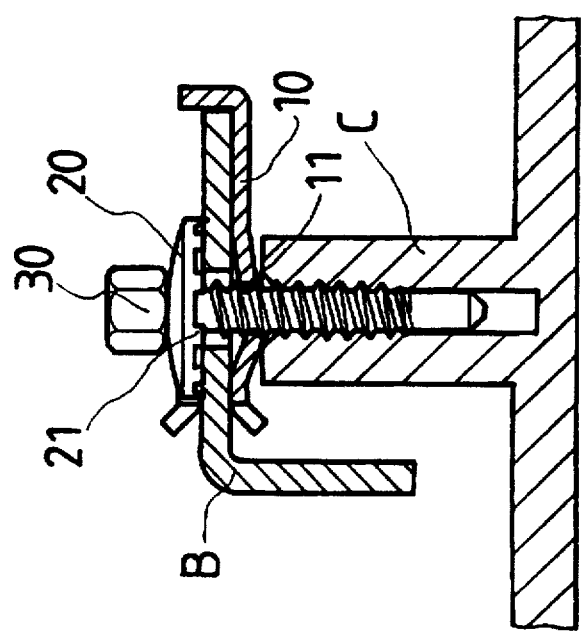
FIG. 6A and FIG. 6B are schematic views illustrating the mounting structure in a mounted state.
Figure 6A:
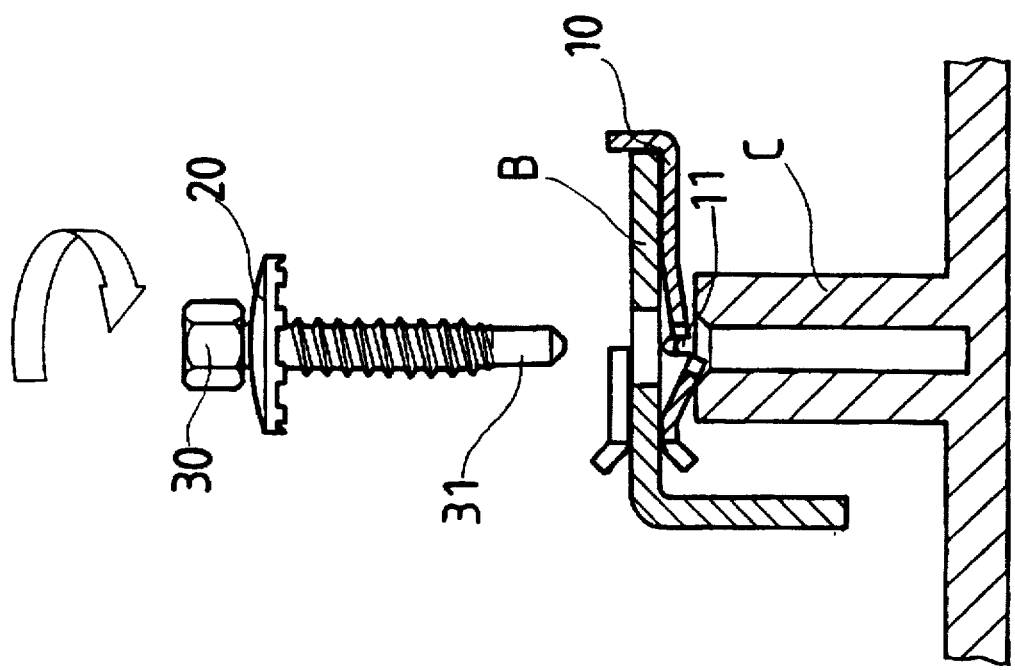

In actual operation, referring to FIGS. 6A and 6B, the locking plate 10 with its locking hole 11 orienting downwardly is fitted below the mount B such that the bottom side of the locking plate 10 rests against a frame structure C. Then the screw 30 with its washer 20 is driven into the mount B from above, the screw 30 passing in sequence the washer 20, the mount B, the locking hole 11 and piercing into the frame structure C with the guide portion 31. After the screw 30 has locked into the top surface of the mount 30, the tooth-like portions 21 at the bottom edge of the washer 20 will grip the mount B so that the washer 20 will not slip away with the turning of the screw 30. At the same time, the locking plate 10 will elevate with the continual turning of the screw 30, imposing a pressure on the threads of the screw 30, thus forcing the screw 30 to stop turning and achieving firm locking of the mount B. This also prevents the screw 30 from getting too deep into the frame structure C which may result in damage to the screw 30 or damage to the frame structure C.

Figure 7:
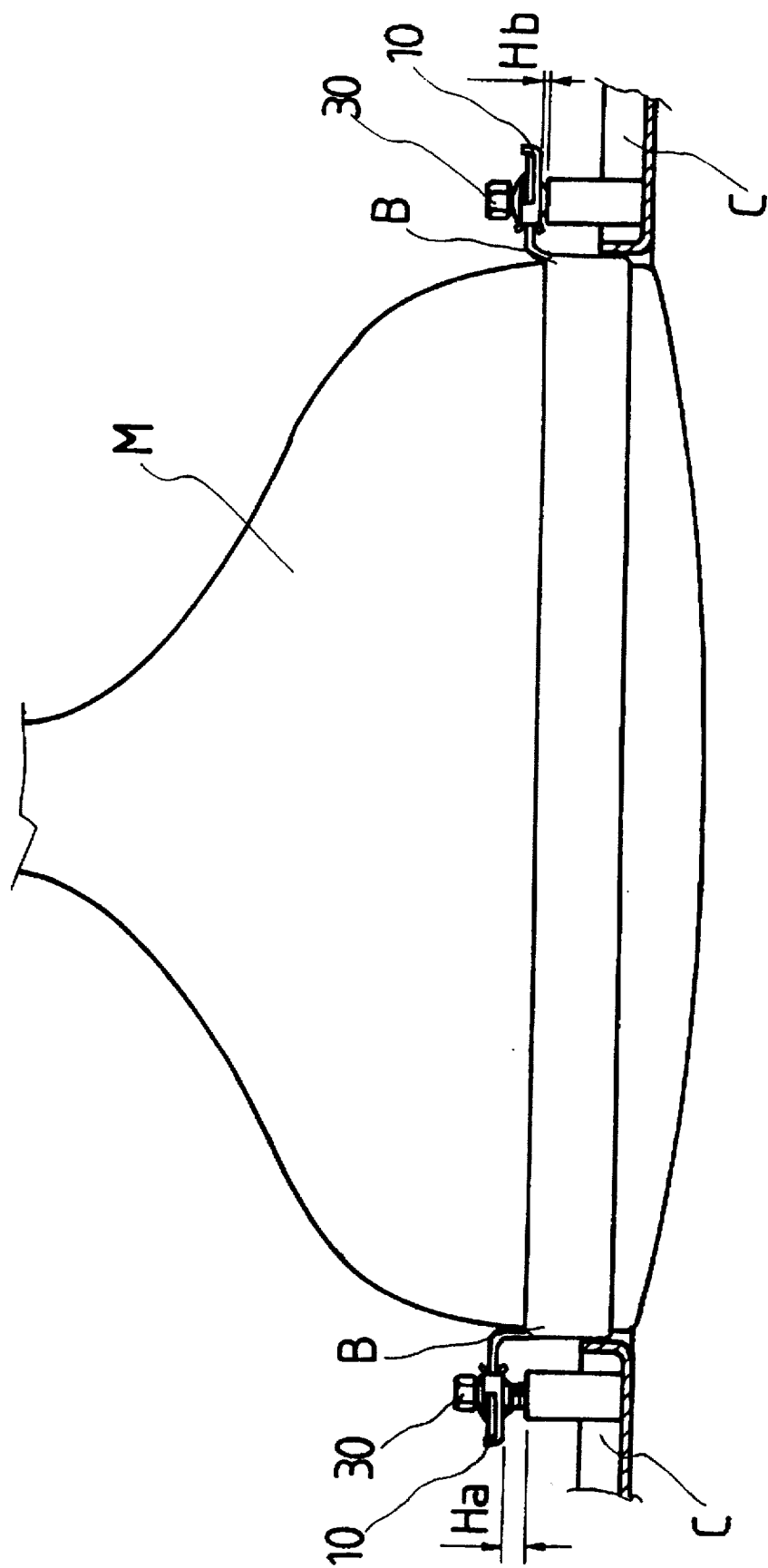
FIG. 7 is a schematic view showing the mounting structure in use.

As the arrangement of the locking plate 10 and the washer 20 may stop the screw 30 from driving unduly deep into the frame structure C, it may also help to adjust the distance between the mount B and the frame structure C. With reference to FIG. 7, in which the present invention is adapted for locking a picture tube M. The picture tube M is coupled with the mount B before being locked to the frame structure C of the housing of a television set. As the mount B itself may not have a uniform height all through due to certain factors during processing, the mount B may be fitted with the locking plates 10 first, and the screen of the picture tube M may then be adjusted to stay on a level state. The screws 30 may be subsequently locked into the mount B. It is then possible to adjust the clearances Ha, Hb between the mount B and the frame structure C to compensate for the non-uniformity of the height of the mount B.

In the present invention, the pawls of the locking plate help to position the mount so that the locking hole may be quickly aligned with the through hole of the mount. The locking plate cooperates with the washer to firmly fasten the mount during assembly to prevent the screw from getting deep into the frame structure due to excessive driving force, thus preventing possible damage to the frame structure or disengagement of the screw. Besides, the clearance between the frame structure and the mount may be adjusted to compensate for any non-uniformity of the mount in height or thickness. Furthermore, the guide portion of the screw helps to quickly guide the screw into the frame structure.

Although the present invention has been illustrated and described with reference to the preferred embodiment thereof, it should be understood that it is in no way limited to the details of such embodiment but is capable of numerous modifications within the scope of the appended claims.

What is claimed is:

1. A mounting structure, comprising:

a locking plate that is substantially a plate-like structure having a locking hole at a central position, said locking hole being obliquely cut so that an inner ring thereof forms a spiral shape to facilitate driving of a screw thereinto, said locking plate having three substantially L-shaped pawls at its outer edge, said pawls being spaced apart with two of said pawls opposite each other and one of said pawls facing an open end, a distance from each of said pawls to the center of said locking hole being equivalent to a distance from the center of a through hole of a mount to an outer periphery of said mount, said opposite pawls each having a plate portion at a top side thereof such that said locking plate may firmly retain said mount, said plate portions of said two opposite pawls and a bottom plate of said locking plate flaring slightly outwardly in the direction of said open end so that said mount may be smoothly fitted into said locking plate; and a screw with a washer, said screw having an elongated tip forming a guide portion, said washer having a bottom side with an outer periphery having a plurality of tooth-like portions.

* * * * *